United States Patent
Chow

(10) Patent No.: US 6,460,288 B1
(45) Date of Patent: Oct. 8, 2002

(54) ANT-PROOF DEVICE THAT MAY CONFUSE THE SENSE OF SMELL AND SIGHT OF AN ANT

(76) Inventor: Tien-Jin Chow, Floor 4, No. 119, Lane 147, Don-Ming Rd., Ta-Li City, Taichung Hsien (TW)

( * ) Notice: Subject to any disclaimer, the term of this patent is extended or adjusted under 35 U.S.C. 154(b) by 0 days.

(21) Appl. No.: 09/904,521

(22) Filed: Jul. 16, 2001

(51) Int. Cl.⁷ ............................. A01M 1/20; A01K 5/00
(52) U.S. Cl. ........................................... 43/107; 119/61
(58) Field of Search .................. 43/107, 121, 132.1; 119/61, 51.5, 6.5, 6.6, 6.7, 6.8

(56) References Cited

U.S. PATENT DOCUMENTS

| | | | |
|---|---|---|---|
| 3,199,245 A | * 8/1965 | Wenting II, et al. | .......... 43/107 |
| 3,968,590 A | * 7/1976 | Kitterman | .................. 43/107 |
| 4,172,336 A | * 10/1979 | Aylor | ...................... 119/6.8 |
| 5,157,866 A | * 10/1992 | Rosie | ........................ 43/121 |

* cited by examiner

*Primary Examiner*—Thomas Price

(57) ABSTRACT

An ant-proof device that may confuse the sense of smell and sight of an ant includes an upper disk, and a lower disk. The upper disk is provided with upper annular walls forming upper annular channels each having an independent loop. The lower disk is provided with lower annular walls forming lower annular channels each having an independent loop. The upper annular walls and the lower annular walls are spaced in a staggered manner. Each upper annular wall may be extended into the lower annular channel, and a distance is defined therebetween. Each lower annular wall may be extended into the upper annular channel, and a distance is defined therebetween.

3 Claims, 6 Drawing Sheets

ANT-PROOF DEVICE THAT MAY CONFUSE THE SENSE OF SMELL AND SIGHT OF AN ANT

BACKGROUND OF THE INVENTION

1. Field of the Invention

The present invention relates to an ant-proof device that may confuse the sense of smell and sight of an ant.

2. Description of the Related Art

The closest prior arts of which the applicant is aware are disclosed in the Taiwanese Patent application No. 82200227, entitled "Multi-Functional Ant-Proof Disk Assembly"; the Taiwanese Patent application No. 85200243, entitled by "Ant-Proof Base"; and the Taiwanese Patent application No. 81200514, entitled by "Ant-Proof Base".

However, the above-mentioned prior arts have the following disadvantages.

1. The conventional ant-proof device employs water to function as a protective layer, so that it is necessary to replace water frequently. Thus, the conventional ant-proof device cannot be operated conveniently.
2. The conventional ant-proof device employs a drug to expel the ants. However, the smell of the drug will affect the health of the human body.
3. The conventional ant-proof device employs an electrical shock to expel the ants, thereby consuming the electrical energy, and thereby easily causing danger to the user when the user inadvertently touches the coil of ant-proof device.

SUMMARY OF THE INVENTION

The primary objective of the present invention is to provide an ant-proof device that may confuse the sense of smell and sight of an ant, thereby achieving an ant-proof effect efficiently.

In accordance with the present invention, there is provided an ant-proof device that may confuse the sense of smell and sight of an ant, comprising: an upper disk, and a lower disk, wherein:

the upper disk has a bottom face provided with a plurality of spaced upper annular walls each of which extends downward, thereby forming a plurality of spaced upper annular channels located between the upper annular walls, each of the upper annular channels has an independent loop, the upper disk has a center formed with a receptacle portion;

the lower disk has a top face provided with a plurality of spaced lower annular walls each of which extends upward, thereby forming a plurality of spaced lower annular channels located between the lower annular walls, each of the lower annular channels has an independent loop, the lower disk has a center formed with a plug portion which may be inserted into the receptacle portion of the upper disk;

the upper annular walls and the lower annular walls are mutually spaced from each other in a staggered manner;

each upper annular wall may be extended into a respective lower annular channel, and a proper distance is defined between each upper annular wall and the bottom face of the respective lower annular channel;

each lower annular wall may be extended into a respective upper annular channel, and a proper distance is defined between each lower annular wall and the bottom face of the respective upper annular channel.

Further benefits and advantages of the present invention will become apparent after a careful reading of the detailed description with appropriate reference to the accompanying drawings.

DETAILED DESCRIPTION OF THE INVENTION

Figure 1:
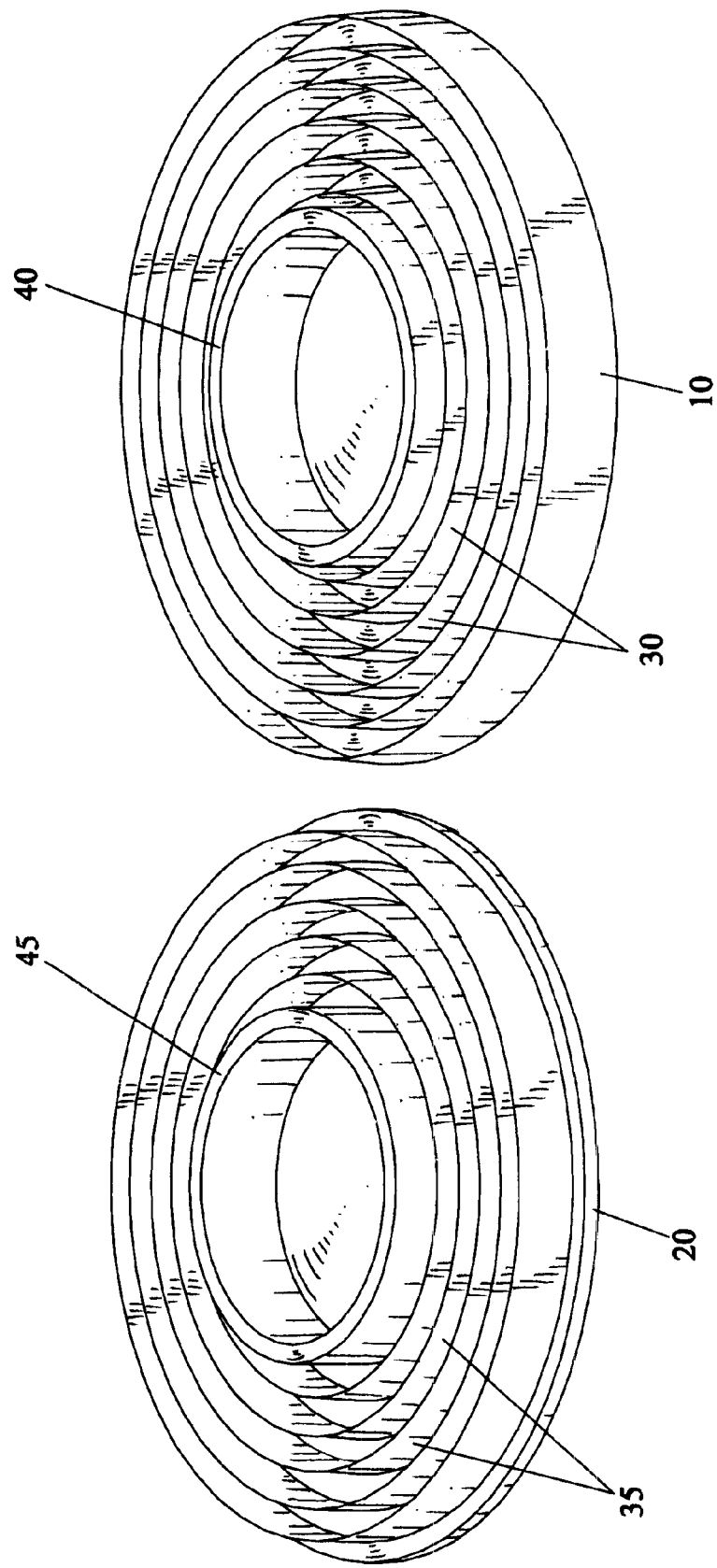
FIG. 1 is an exploded perspective view of an ant-proof device that may confuse the sense of smell and sight of an ant in accordance with a first embodiment of the present invention.
Figure 2:
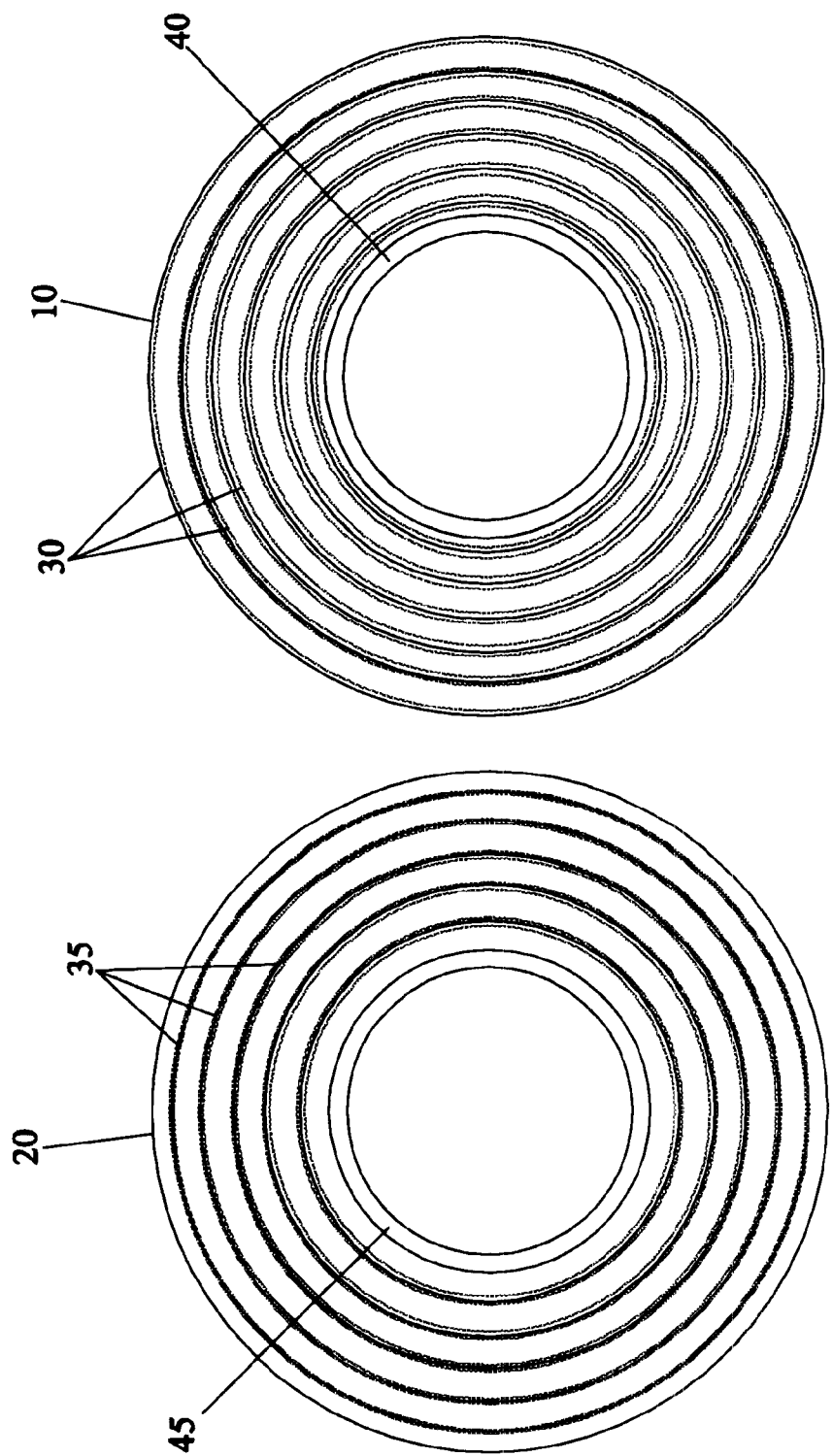
FIG. 2 is a top plan view of the ant-proof device that may confuse the sense of smell and sight of an ant as shown in FIG. 1.
Figure 3:
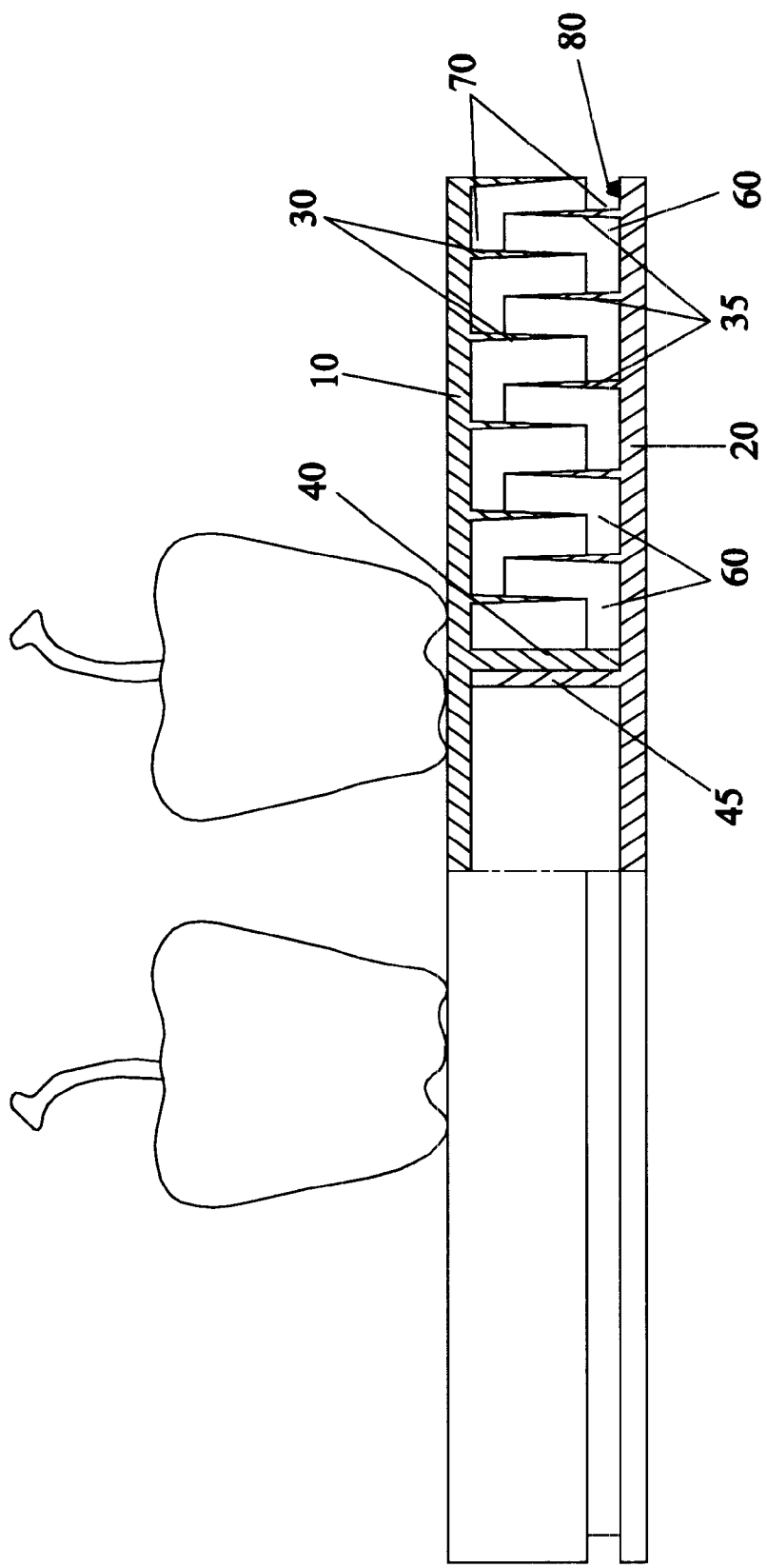
FIG. 3 is a cross-sectional assembly view of the ant-proof device that may confuse the sense of smell and sight of an ant as shown in FIG. 1.

Referring to the drawings and initially to FIGS. 1–3, an ant-proof device that may confuse the sense of smell and sight of an ant in accordance with a first embodiment of the present invention comprises an upper disk 10, and a lower disk 20.

The upper disk 10 has a bottom face provided with a plurality of concentrically arranged spaced upper annular walls 30 each of which extends downward, thereby forming a plurality of spaced upper annular channels 60 located between the upper annular walls 30. Each of the upper annular channels 60 has an independent loop. The upper disk 10 has a center formed with a receptacle portion 40.

The lower disk 20 has a top face provided with a plurality of concentrically arranged spaced lower annular walls 35 each of which extends upward, thereby forming a plurality of spaced lower annular channels 70 located between the lower annular walls 35. Each of the lower annular channels 70 has an independent loop. The lower disk 20 has a center formed with a plug portion 45 which may be inserted into the receptacle portion 40 of the upper disk 10.

Figure 5:
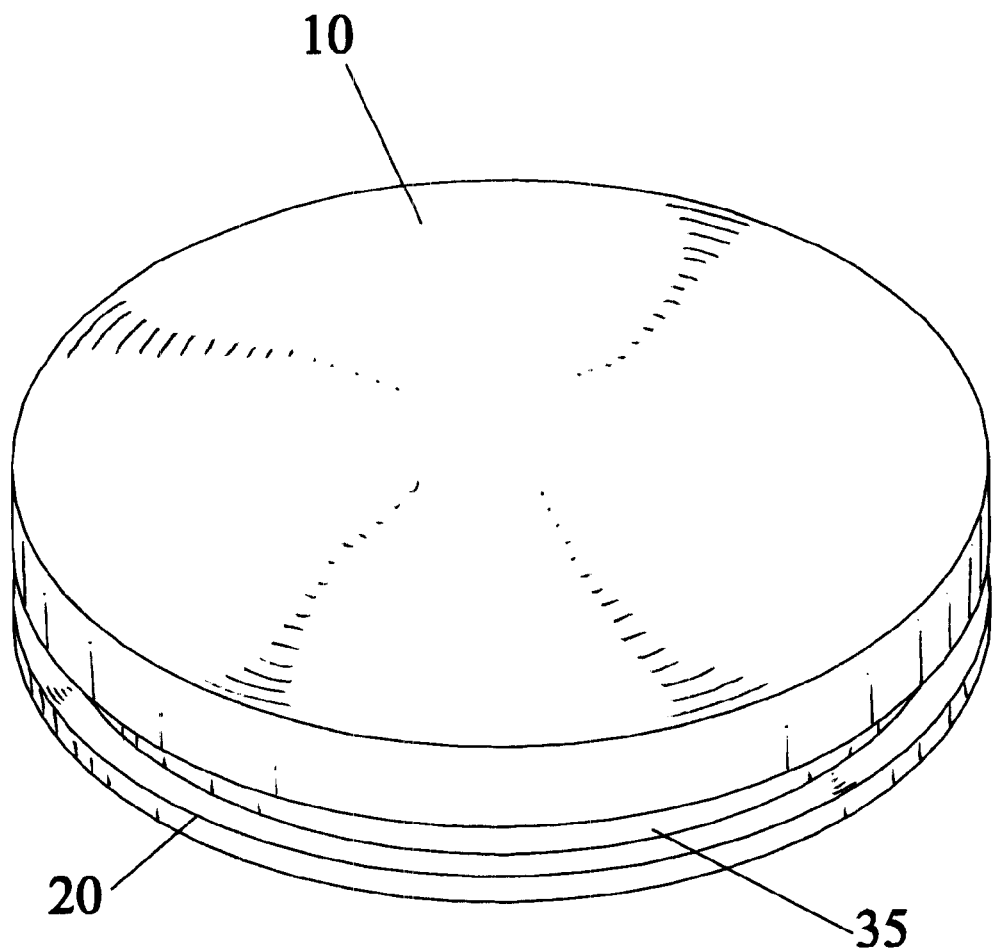
FIG. 5 is a perspective assembly view of the ant-proof device that may confuse the sense of smell and sight of an ant as shown in FIG. 1.

Referring to FIGS. 1, 3 and 5, the upper disk 10 overlaps the lower disk 20, wherein the plug portion 45 of the lower disk 20 is inserted into the receptacle portion 40 of the upper disk 10 to form a central support column, and the upper annular walls 30 and the lower annular walls 35 are mutually spaced from each other in a staggered manner. In other words, each lower annular wall 35 is located between any two adjacent upper annular walls 30. Thus, each upper annular wall 30 may be extended into a respective lower annular channel 70, and a proper distance is defined between each upper annular wall 30 and the bottom face of the respective lower annular channel 70, while each lower annular wall 35 may be extended into a respective upper annular channel 60, and a proper distance is defined between each lower annular wall 35 and the bottom face of the respective upper annular channel 60. It is appreciated that, the distance has to be greater than the height that the ant 80 may climb and reach, thereby preventing the ant 80 from directly climbing up to the upper disk 10 from the outer periphery of the lower disk 20.

Referring to FIGS, 3 and 4, according to the present invention, the upper disk 10 is provided with a plurality of concentrically arranged spaced upper annular walls 30, and the lower disk 20 is provided with a plurality of concentrically arranged spaced upper annular walls 35 staggered with the upper annular walls 30. The upper disk 10 defines a plurality of upper annular channels 60 each having an independent loop, and the lower disk 20 defines a plurality of lower annular channels 70 each having an independent loop.

The staggered upper and lower annular walls 30 and 35 may co-operate the staggered upper and lower annular channels 60 and 70 to form a staggered and complicated path like a labyrinth. According to the custom of the ant 80, it is used to traveling along a corner such as a wall corner or the like, according to its sense of sight and smell.

Referring to FIG. 3, if the ant wishes to reach the top face of the upper disk 10, it has to climb the outermost layer of lower annular wall 35 to enter the lower annular channel 70, then to move around the lower annular channel 70 along the corner, then to climb the lower annular wall 35 to enter the inner layer of lower annular channel 70. Thus, the ant 80 has to climb multiple layers of lower annular wall 35 to reach the upper disk 10. The lower annular walls 35 are staggered with the upper annular walls 30, thereby adversely affecting the visual identification of the ant 80 to the travel path. The lower annular channel 70 defined between any two adjacent lower annular walls 35 has an independent loop, and is very broad, so that the lower annular channel 70 is very available for travel of the ant. Thus, the ant 80 will move around the lower annular channels 70. During movement of the ant 80 around the lower annular channels 70, each of the upper and lower annular channels 60 and 70 will create the same vision, thereby easily causing optical confusion and misjudgment to the ant 80, such that the ant 80 will move around the lower annular channels 70 again and again unit it pauses or dies.

If the food is placed on the top of the upper disk 10, the staggered upper annular walls 30 and lower annular walls 35 will refrain the smell of the food from dispersing, thereby producing a dilute effect, so that the smell of the food at the inner layers of upper and lower annular channels 60 and 70 is weaker. In addition, each of the upper and lower annular channels 60 and 70 creates the same vision, thereby causing optical confusion and misjudgment to the ant 80, so that the ant 80 will stop searching the food, thereby achieving an ant-proof effect.

Figure 4:
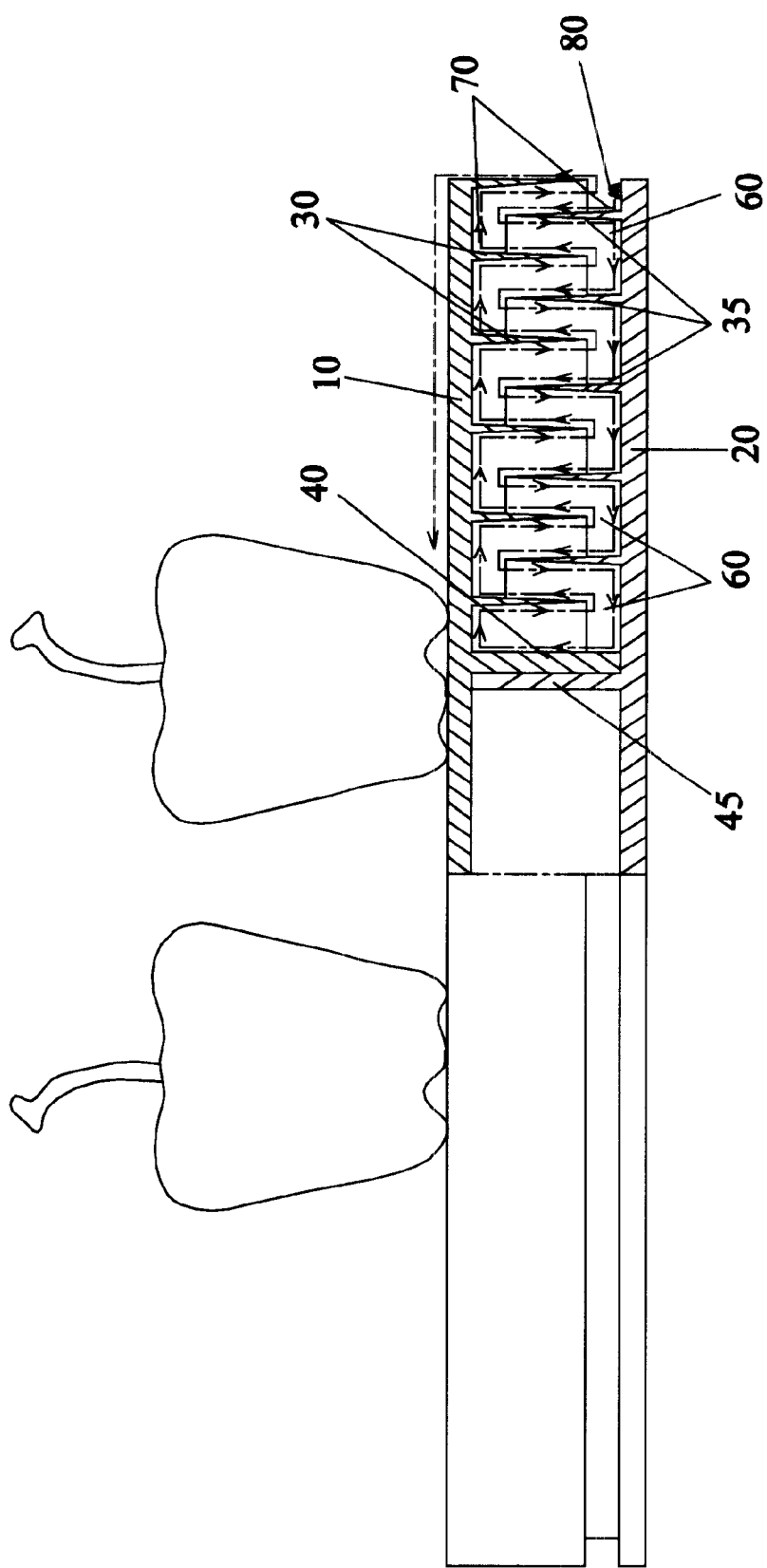
FIG. 4 is a schematic operational view of the ant-proof device that may confuse the sense of smell and sight of an ant as shown in FIG. 3 in use.

FIG. 4 is a schematic view showing the shortest travel path of the ant 80. The upper disk 10 is provided with a plurality of concentrically arranged spaced upper annular walls 30, and the lower disk 20 is provided with a plurality of concentrically arranged spaced lower annular walls 35 staggered with the upper annular walls 30, thereby forming staggered and spaced upper annular channels 60 and lower annular channels 70. When the ant 80 enters the lower annular channels 70, it will optically confuse to the path. If the ant 80 can reach the upper annular channels 60 during the long-term surrounding travel, it will be subjected to action of the gravity when moving around the upper annular channels 60, thereby greatly affecting movement of the ant 80 such that it easily drops onto the ground due to fatigue, thereby achieving an ant-proof effect.

Figure 6:
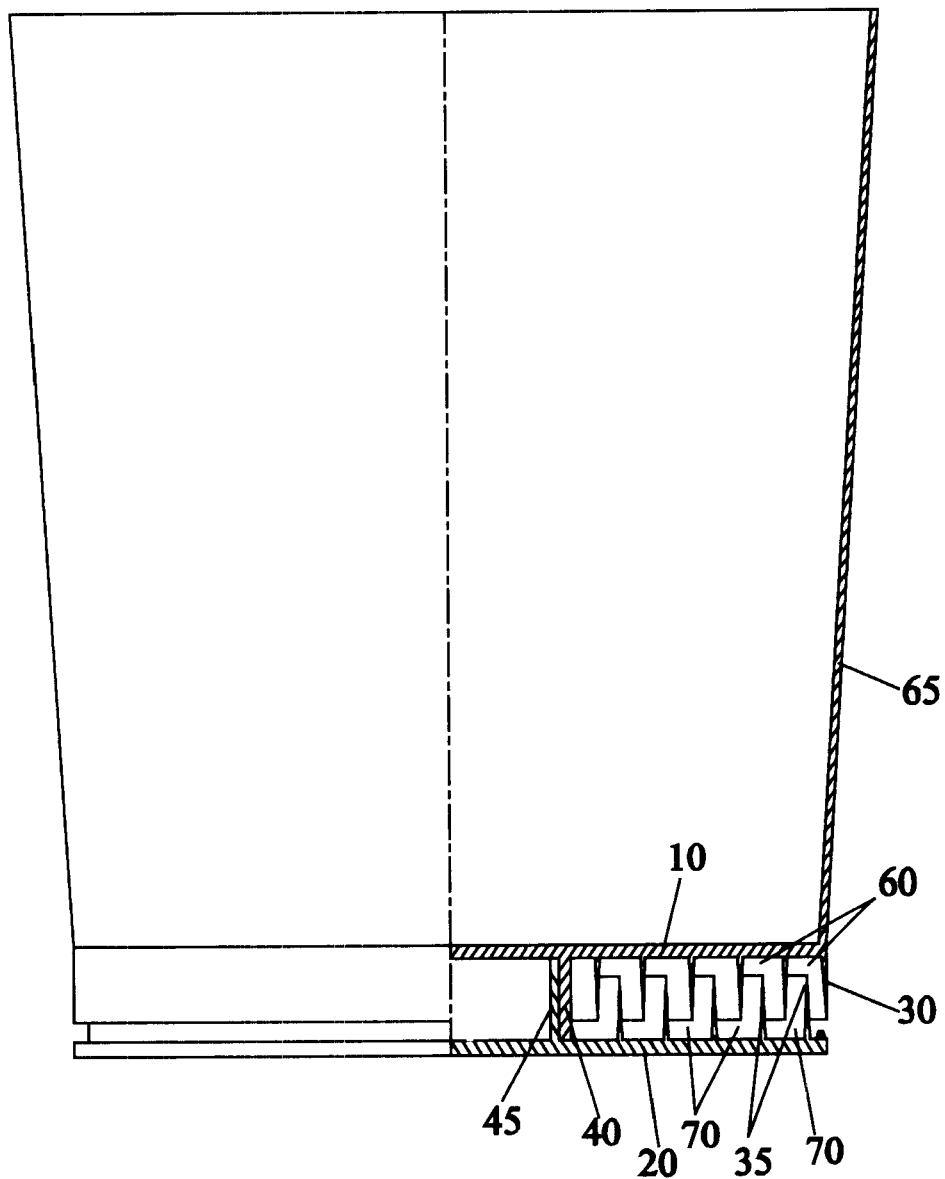
FIG. 6 is a schematic cross-sectional view of an ant-proof device that may confuse the sense of smell and sight of an ant in accordance with a second embodiment of the present invention.

Referring to FIG. 6, in accordance with a second embodiment of the present invention, an upward extended annular wall 65 is mounted on the outer periphery of the upper disk 10, thereby achieving an ant-proof effect more efficiently.

Accordingly, the ant-proof device that may confuse the sense of smell and sight of an ant in accordance with the present invention has the following advantages.

1. The structure of the present invention may be employed easily and conveniently without wasting the electrical energy, and without the possibility of inadvertently conducting electricity.
2. The present invention don't affect the surrounding environment, and will not cause danger to the human body.
3. The structure of the present invention is simplified, and may be manufactured easily, thereby decreasing cost of fabrication.

Although the invention has been explained in relation to its preferred embodiment as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. An ant-proof device that may confuse the sense of smell and sight of an ant, comprising: an upper disk, and a lower disk, wherein:

the upper disk has a bottom face provided with a plurality of spaced upper annular walls each of which extends downward, thereby forming a plurality of spaced upper annular channels located between the upper annular walls, each of the upper annular channels has an independent loop, the upper disk has a center formed with a receptacle portion;

the lower disk has a top face provided with a plurality of spaced lower annular walls each of which extends upward, thereby forming a plurality of spaced lower annular channels located between the lower annular walls, each of the lower annular channels has an independent loop, the lower disk has a center formed with a plug portion which may be inserted into the receptacle portion of the upper disk;

the upper annular walls and the lower annular walls are mutually spaced from each other in a staggered manner;

each upper annular wall may be extended into a respective lower annular channel, and a proper distance is defined between each upper annular wall and the bottom face of the respective lower annular channel;

each lower annular wall may be extended into a respective upper annular channel, and a proper distance is defined between each lower annular wall and the bottom face of the respective upper annular channel.

2. The ant-proof device that may confuse the sense of smell and sight of an ant in accordance with claim 1, wherein the upper annular walls are concentrically arranged with each other, and the lower annular walls are concentrically arranged with each other.

3. The ant-proof device that may confuse the sense of smell and sight of an ant in accordance with claim 1, further comprising an upward extended annular wall mounted on an outer periphery of the upper disk.

\* \* \* \* \*